United States Patent
Jomaa et al.

(10) Patent No.: US 10,919,384 B2
(45) Date of Patent: Feb. 16, 2021

(54) MOUNT ASSEMBLY WITH ELECTRO-HYDRO-PNEUMATIC SWITCHABLE DISPLACEMENT ELEMENTS

(71) Applicant: GM Global Technology Operations LLC, Detroit, MI (US)

(72) Inventors: Sam M. Jomaa, Northville, MI (US); Wojciech E. Suchta, Richmond Hill (CA); Craig W. Lewitzke, Commerce Township, MI (US); Daniel G. Gannon, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 159 days.

(21) Appl. No.: 16/041,365

(22) Filed: Jul. 20, 2018

(65) Prior Publication Data

US 2020/0023732 A1   Jan. 23, 2020

(51) Int. Cl.

| | |
|---|---|
| *F16F 13/10* | (2006.01) |
| *B60K 17/00* | (2006.01) |
| *F16M 7/00* | (2006.01) |
| *F16F 13/26* | (2006.01) |
| *B62D 65/10* | (2006.01) |

(52) U.S. Cl.
CPC .............. *B60K 17/00* (2013.01); *F16F 13/10* (2013.01); *F16F 13/103* (2013.01); *F16F 13/26* (2013.01); *F16M 7/00* (2013.01); *B62D 65/10* (2013.01); *F16F 2226/04* (2013.01); *F16F 2228/066* (2013.01)

(58) Field of Classification Search
CPC .. B60K 5/1208; B60K 5/1283; B60K 5/1241; B60K 5/1291; F16F 13/10; F16F 13/101; F16F 13/102; F16F 13/105; F16F 13/106; F16F 13/107; F16F 2228/066
See application file for complete search history.

(56) References Cited

U.S. PATENT DOCUMENTS

| | | | | |
|---|---|---|---|---|
| 4,657,232 A | * | 4/1987 | West ........................ | F16F 13/26 267/140.13 |
| 6,267,362 B1 | * | 7/2001 | Satori ..................... | F16F 13/103 267/140.13 |
| 6,364,295 B1 | * | 4/2002 | Wolf ........................ | F16F 13/10 267/140.14 |
| 7,052,003 B2 | * | 5/2006 | Ueki ....................... | F16F 13/107 267/140.13 |

(Continued)

*Primary Examiner* — Emma K Frick

(57) ABSTRACT

A system and method using a mount assembly for attaching a powertrain to a structural member of a vehicle. The mount assembly includes a first compliant member, a second compliant member, a first fluid chamber, a second fluid chamber, a third fluid chamber, a pressure compliant membrane, and a valve. A fluid conduit interconnects the first fluid chamber with the second fluid chamber to allow a fluid to pass from the first fluid chamber to the second fluid chamber. The third fluid chamber has an opening in communication with the second fluid chamber and a vent port. The pressure compliant membrane seals the opening between the second fluid chamber and the third fluid chamber. The valve selectively seals the vent port in the third fluid chamber. A first stiffness profile of the mount assembly is selected by actuating the valve to open the vent port. A second stiffness profile of the mount assembly is selected by actuating the valve to close the vent port.

19 Claims, 3 Drawing Sheets

(56) References Cited

U.S. PATENT DOCUMENTS

| | | | | |
|---|---|---|---|---|
| 8,333,368 B2* | 12/2012 | Rooke | ............... | F16F 13/268 |
| | | | | 188/282.6 |
| 8,594,911 B2* | 11/2013 | Okamoto | ............ | F16F 13/264 |
| | | | | 267/140.15 |
| 8,973,704 B2* | 3/2015 | Kim | .................. | F16F 13/10 |
| | | | | 181/207 |
| 9,074,653 B2* | 7/2015 | Gannon | ............. | B60K 5/1266 |
| 9,074,654 B2* | 7/2015 | Ueki | ................. | F16F 13/107 |
| 9,587,704 B2* | 3/2017 | Lee | .................... | F16F 15/005 |
| 9,707,836 B2* | 7/2017 | Sykes | ................. | F16F 1/3849 |
| 9,719,575 B2* | 8/2017 | Kojima | ............... | B60K 5/1208 |
| 10,167,923 B2* | 1/2019 | Suchta | ................ | B60K 1/00 |
| 10,502,279 B2* | 12/2019 | Kojima | .............. | B60K 5/1283 |
| 2012/0090912 A1* | 4/2012 | Gannon | ............... | F16F 13/14 |
| | | | | 180/312 |
| 2012/0292837 A1* | 11/2012 | Hettler | ............... | F16F 13/108 |
| | | | | 267/140.11 |
| 2019/0048897 A1* | 2/2019 | Weber | ................. | F16F 9/065 |
| 2020/0011396 A1* | 1/2020 | Nagashima | ......... | F16F 13/107 |

* cited by examiner

MOUNT ASSEMBLY WITH ELECTRO-HYDRO-PNEUMATIC SWITCHABLE DISPLACEMENT ELEMENTS

FIELD

The present disclosure relates generally to devices and methods for interconnecting a first structural member to a second structural member and, more particularly, to a mount assembly that has a stiffness profile for reducing the vibrations present in one of the structural members from being transmitted to the other structural member.

BACKGROUND

The statements in this section merely provide background information related to the present disclosure and may or may not constitute prior art.

A mount assembly is commonly found in motor vehicles. Mount assemblies have two primary functions. Firstly, the mount assembly is employed to secure a component of a vehicle, such as a powertrain, to the vehicle body or frame and, secondly, to reduce or eliminate the transmission of forces or vibrations present in the powertrain from propagating to the vehicle body or frame.

To achieve their primary functions, mount assemblies typically have a structural frame or bracket that supports a compliant member or rubber insert. The compliant member has a mounting feature that is configured to attach to the powertrain or other structural component. The structural frame of the mount assembly is configured to attach to the vehicle body or frame. The compliant member has a known spring stiffness profile that varies based on the displacement of the compliant member within the structural frame of the mount assembly. The spring stiffness profile of the compliant member is fixed and is not adaptable to changing operating conditions of the vehicle.

While conventional mount assemblies achieve their intended purpose there is a need in the art for an improved design for a mount assembly. The improved design should provide a mount assembly that, after being installed on a vehicle, is controllable such that different stiffness profiles may be selected based on varying vehicle operating conditions.

SUMMARY

According to several aspects, a mount assembly for attaching a powertrain to a structural member of a vehicle is disclosed. The mount assembly includes a first support member having an attachment end attachable to the powertrain, a second support member having an attachment end attachable to the structural member of the vehicle, a first compliant member, a second compliant member, a second snubber member, a first fluid chamber, a second fluid chamber, a third fluid chamber, a fluid conduit, a pressure compliant membrane, and a valve. The second support member is spaced apart from the first support member. The first compliant member includes a first attachment end fixed to the first support member, a second attachment end fixed to the second support member, and a first snubber member opposite the first attachment end. The second compliant member is fixed to the second support member and is space apart from the first snubber portion. The second snubber member is fixed to the second support member and spaced apart from the second compliant member. The first fluid chamber is defined by a surface of the second compliant member, a surface of the second support member and a surface of the second snubber member. The second fluid chamber is defined by a first plurality of surfaces of the second support member. The fluid conduit interconnects the first fluid chamber with the second fluid chamber to allow a fluid to pass from the first fluid chamber to the second fluid chamber. The third fluid chamber is adjacent the second fluid chamber and defined by a second plurality of surfaces of the second support member. The third fluid chamber has an opening in communication with the second fluid chamber and a vent port. The pressure compliant membrane is attached to the second support structure and seals the opening between the second fluid chamber and the third fluid chamber. The valve selectively seals the vent port in the third fluid chamber.

In another aspect of the present disclosure, the first and second fluid chambers are filled with a hydraulic fluid, such as glycol.

In another aspect of the present disclosure, the third fluid chamber is filled with air.

In another aspect of the present disclosure, a controlled actuator is coupled to the valve to selectively open the valve and allow air to exit the third fluid chamber.

In another aspect of the present disclosure, the second support member has an aperture at an end of the second support member.

In another aspect of the present disclosure, the first compliant member is an elongated member that spans the aperture and is attached to an inside surface of the aperture at a first end and to an opposing inside surface of the aperture at a second end.

In another aspect of the present disclosure, the second compliant member and the second snubber member are formed as a unitary member.

In another aspect of the present disclosure, the first fluid chamber is a bladder formed within the unitary member.

In another aspect of the present disclosure, the fluid conduit is formed in the second support member and interconnects the bladder with the second fluid chamber.

In another aspect of the present disclosure, the pressure compliant membrane is a flexible membrane that under pressure produced by the fluid in the second chamber protrudes into the third chamber to increase a volume of the second fluid chamber.

In another aspect of the present disclosure, a method for attaching a powertrain to a structural member of a vehicle using a mount assembly is disclosed. The method includes providing a first support member, providing a second support member, providing a first compliant member, providing a second compliant member, providing a second snubber member, providing a first fluid chamber, providing a second fluid chamber, interconnecting the first fluid chamber with the second fluid chamber, providing a third fluid chamber, sealing the opening between the second fluid chamber and the third fluid chamber, determining a desired stiffness profile of the mount assembly, actuating a valve to close the vent port in the third fluid chamber and actuating a valve to open the vent port in the third fluid chamber.

In yet another aspect of the present disclosure, actuating the valve to close the vent port in the third fluid chamber achieves a first stiffness profile of the mount assembly.

In yet another aspect of the present disclosure, actuating a valve to open the vent port in the third fluid chamber achieves a second stiffness profile of the mount assembly.

In yet another aspect of the present disclosure, sealing the opening between the second fluid chamber and the third fluid chamber with a pressure compliant membrane attached to the second support structure further includes preventing the pressure compliant membrane from protruding into the third fluid chamber when the first stiffness profile is desired.

In yet another aspect of the present disclosure, sealing the opening between the second fluid chamber and the third fluid chamber with a pressure compliant membrane attached to the second support structure further includes allowing the pressure compliant membrane to protrude into the third fluid chamber when the second stiffness profile is desired.

In yet another aspect of the present disclosure, actuating a valve to close the vent port in the third fluid chamber to achieve a first stiffness profile of the mount assembly further includes fixing the volume of the second fluid chamber to prevent fluid from passing from the first fluid chamber to the second fluid chamber.

In yet another aspect of the present disclosure, actuating a valve to open the vent port in the third fluid chamber to achieve a second stiffness profile of the mount assembly further includes increasing the volume of the second fluid chamber to allow fluid to pass from the first fluid chamber to the second fluid chamber.

In yet another aspect of the present disclosure, actuating a valve to open the vent port in the third fluid chamber to achieve a first stiffness profile of the mount assembly further includes achieving a first stiffness profile that has a lower stiffness over the same displacement of the first compliant member compared the second stiffness profile.

In yet another aspect of the present disclosure, actuating a valve to close the vent port in the third fluid chamber to achieve a second stiffness profile of the mount assembly further includes achieving a second stiffness level that has a greater stiffness over the same displacement of the first compliant member compared the first stiffness profile.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
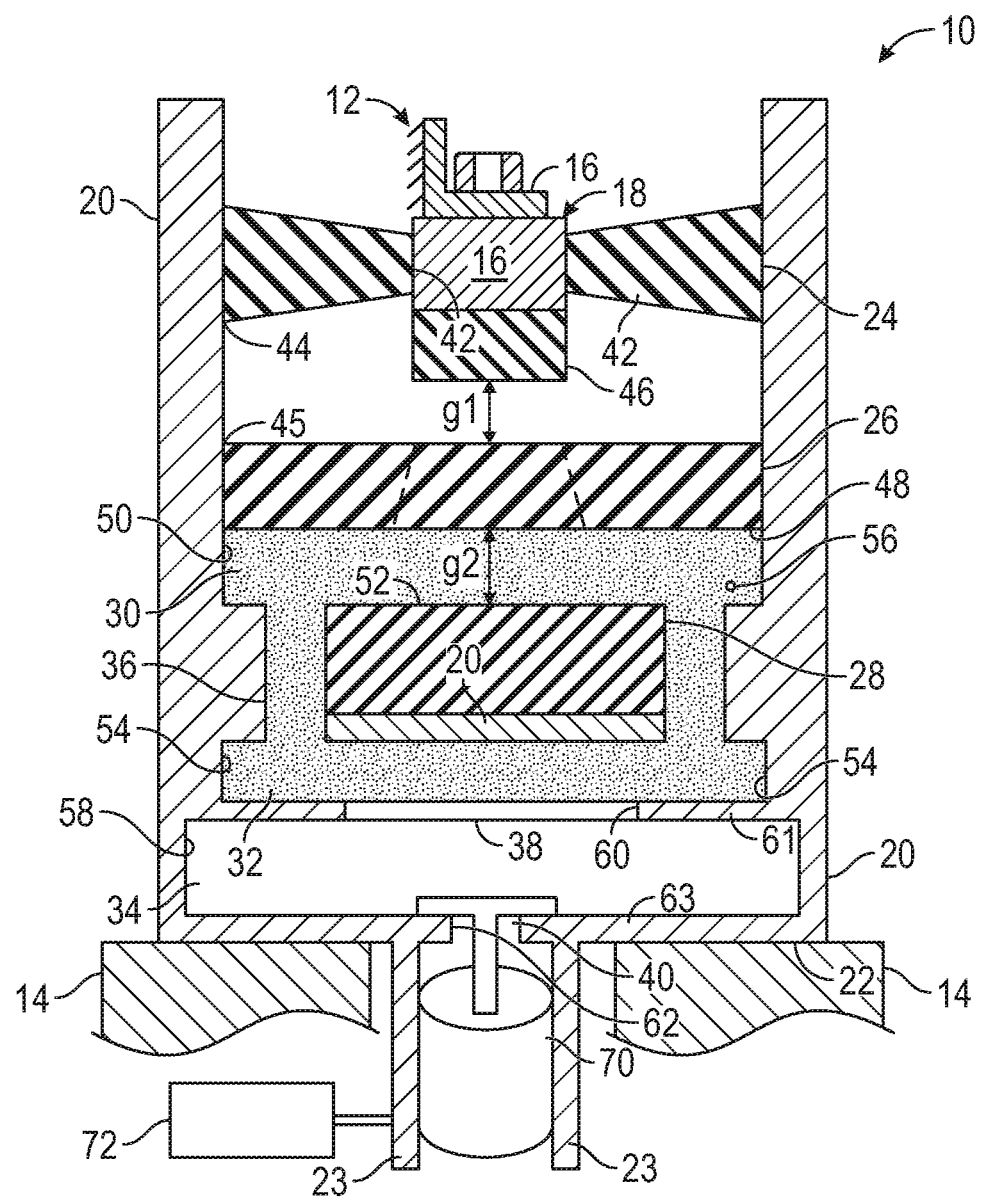
FIG. 1 is a schematic of a mount assembly, in accordance with one aspect of the invention.

With reference to FIG. 1, a schematic of a mount assembly 10 is illustrated in accordance with the present invention. Mount assembly 10 is configured to attach a first structure 12, such as a powertrain, to a second structure 14, such as a structural member of a vehicle. Mount assembly 10 has a first support member 16 that has an attachment end 18 attachable to the powertrain or first structure 12 and a second support member 20 having an attachment end 22 attachable to second structure 14 or the structural member of the vehicle. The second support member 20 is spaced apart from the first support member 16. As will become clear from the present disclosure, mount assembly 10 is configured to reduce or eliminate the transmission of forces or vibrations generated in one of the members to the other member. In one example, the first support member 16 is a metal block or the like that is configured to attached to the first structure or powertrain 12 through an attachment means such as a bolt and a threaded aperture in the metal block. Similarly, second support member 20 is a metal housing that has at attachment end 22, a pair of flanges 23 that have apertures (not shown) that in conjunction with a bolt or pin is attachable to a vehicle structure such as a vehicle frame or beam.

Mount assembly 10 further includes a first compliant member 24, a second compliant member 26, a second snubber member 28, a first fluid chamber 30, a second fluid chamber 32, a third fluid chamber 34, a fluid conduit 36 interconnecting the first fluid chamber with the second fluid chamber, a pressure compliant membrane 38, and a valve 40, as described in further detail below.

The first compliant member 24 has a first attachment end or surface 42 fixed to first support member 16 and a second attachment end 44 fixed to the second support member 20. First attachment end or surface 42 may be fixed or secured to first support member 16 by over-molding or insert molding. Likewise, second attachment end 44 may be fixed or secured to second support member 20 by over-molding or insert molding or other suitable means. The first compliant member 24 is made of rubber or like material that has a known stiffness value $K_{sm}$. Additionally, a first snubber member 46 is attached to the first support member 16 or metal block opposite the attachment end 18. Snubber member 46 may be fixed or secured to the first support member 16 or metal block by over-molding or insert molding or other suitable means. Snubber member 46 is made of rubber or like material that has a known stiffness value $K_{s1}$.

The second compliant member 26 is fixed to the second support member 20 and spaced apart from the first snubber member by a distance $g_1$. Second compliant member 26 is made of rubber or like material that has a known stiffness value $K_{s2}$. Second compliant member 26 may be fixed or secured to second support member 20 by over-molding or insert molding or other suitable means.

The second snubber member 28 is fixed to the second support member 20 and spaced apart from the second compliant member 26 by a distance $g_2$. Second snubber member 28 is made of rubber or like material that has a known stiffness value $K_{sn}$. Second snubber member 28 may be fixed or secured to second support member 20 by over-molding or insert molding or other suitable means.

The first fluid chamber 30 is provided in mount assembly 10 for holding a volume of fluid such as hydraulic fluid 56 between the second compliant member 26 and the second snubber member 28. A surface 48 of the second compliant member 26, a surface 50 of the second support member 20 and a surface 52 of the second snubber member 28 define the first fluid chamber 30.

The second fluid chamber 32 is provided in mount assembly 10 for receiving a volume of fluid from first fluid chamber 30. A first plurality of surfaces 54 of the second support member 20 define second fluid chamber 32. The fluid conduit 36 interconnects the first fluid chamber 30 with the second fluid chamber 32 to allow the fluid 56 to pass from the first fluid chamber 30 to the second fluid chamber 32.

Adjacent the second fluid chamber 32 is the third fluid chamber 34. The third fluid chamber 34 is defined by a second plurality of surfaces 58 of the second support member 20. A fluid such as air is disposed in the third fluid chamber. An opening or aperture 60 is disposed in a dividing wall 61 between the second and third fluid chambers 32, 34. Opposite opening 60, a vent port 62 is provided through an exterior wall 63 of the second support member 20.

Attached to the second support member 20 and disposed across the opening 60 in the dividing wall 62 is the pressure compliant membrane 38. The pressure compliant membrane 38 seals the opening 60 between the second fluid chamber 32 and the third fluid chamber 34 preventing fluid from passing from the second fluid chamber 32 to the third fluid chamber 34. However, the pressure compliant membrane 38 is a flexible membrane that under pressure produced by the fluid 56 in the second chamber 32 protrudes into the third chamber 34 effectively increasing the volume of the second fluid chamber 32 and allowing the volume to decrease in the first fluid chamber. The pressure compliant membrane 38 is made of a non-porous material such as rubber or the like.

The valve 40 is configured to seal the vent port 62 in the third fluid chamber 34. The air or other fluid disposed in third fluid chamber 34 is allowed to escape the third fluid chamber 34 by selectively actuating valve 40 to open or close vent port 62. Additionally, the mount assembly further includes a controlled actuator 70 coupled to the valve 40 to selectively actuate the valve 40 and allow air to exit the vent port 62 in the third fluid chamber 34. Controlled actuator 70 is in electrical communication with a control system 72. Control system 72 determines an appropriate overall stiffness level for the mount assembly 10 based on vehicle operating conditions, such as, engine speed, vehicle speed, vehicle body movement, etc.

The mount assembly 10 is capable of achieving a two different stiffness profiles. A first stiffness profile is achieved by sending a control signal to the controlled actuator 70 to actuate the valve 40 to open the vent port 62 to release the fluid (i.e. air) in third fluid chamber 34. A first linear stiffness level of first stiffness profile is present in the mount assembly 10 until the first compliant member 24 is displaced the distance g1. A second linear stiffness level of first stiffness profile is achieved in mount assembly 10 when the first compliant member 24 is displaced the distance g1 and until the second compliant member 26 is displaced a distance g2. After the first compliant member 24 is displaced the distance g1 and second compliant member 26 is displaced a distance g2 the stiffness level of first stiffness profile increases non-linearly according to the combined stiffness of $K_{sm}$, $K_{s1}$, $K_{s2}$, and $K_{sn}$ with additional displacement of first compliant member 24 and second compliant member 26. Since the fluid in first fluid chamber 30 is allowed to flow to the second fluid chamber 32, forces are not transmitted from the second compliant member 26 through the fluid to snubber 28.

A second stiffness profile is achieved in mount assembly 10 by sending a control signal to the controlled actuator 70 to actuate the valve 40 to close the vent port 62 to prevent the fluid (i.e. air) in third fluid chamber 34 from escaping chamber 34. A first linear stiffness level of second stiffness profile is present in the mount assembly 10 until the first compliant member 24 is displaced the distance g1. Since the fluid in first fluid chamber 30 is prevented from flowing to the second fluid chamber 32 and the fluid is incompressible, forces are transmitted from the second compliant member 26 through the fluid to snubber 28. After the first compliant member 24 is displaced the distance g1 the stiffness level of second stiffness profile increases non-linearly according to the combined stiffness of $K_{sm}$, $K_{s1}$, $K_{s2}$, and $K_{sn}$ with the additional displacement of the first compliant member 24 and the second compliant member 26.

Figure 2A:
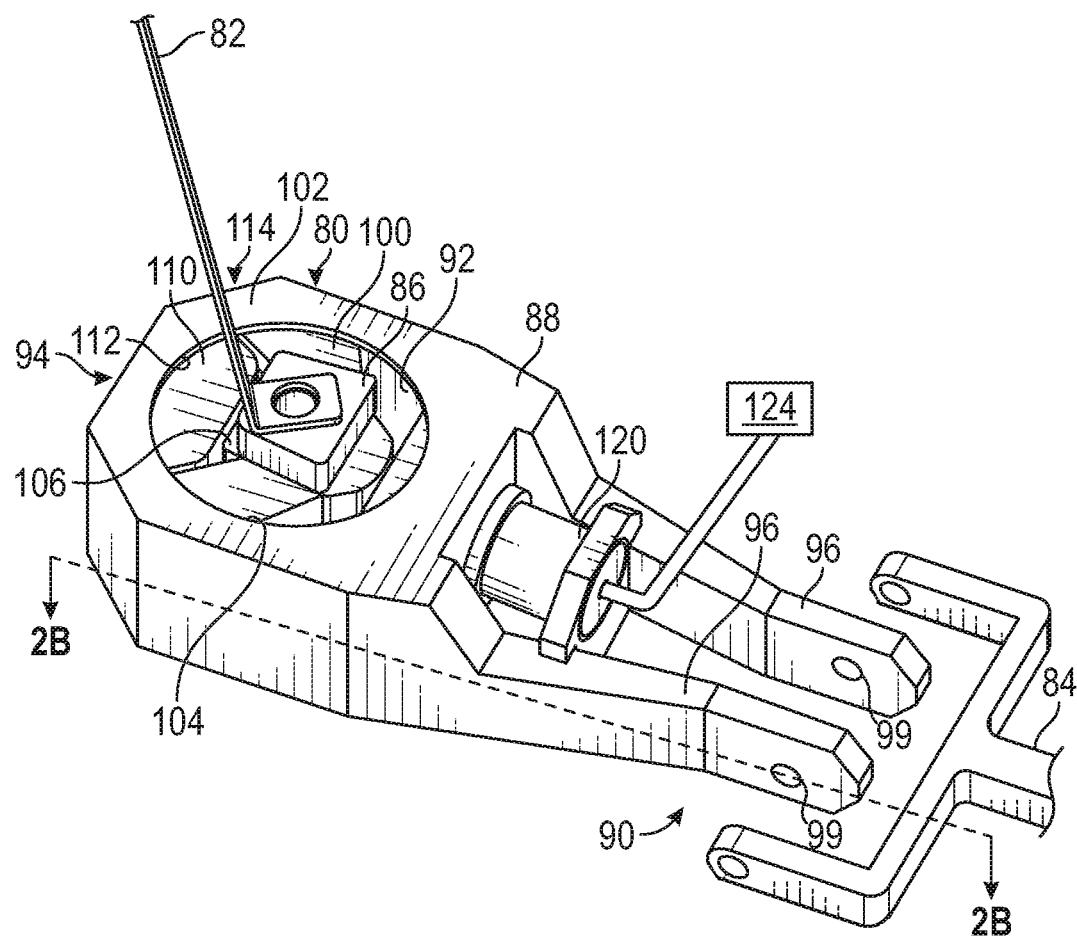
FIG. 2a is a perspective view of a torque strut utilizing the mount assembly, in accordance with an aspect of the present invention.

Referring now to FIG. 2a, a perspective view of a torque strut 80 utilizing the mount assembly 10 described above is illustrated, in accordance with an embodiment of the present invention. Strut 80 is configured to attach a structural member of a vehicle 82 to a structural member of a powertrain 84. Strut 80 has a mounting block 86 that is attachable to the structural member of the vehicle 82 and a strut body 88 having an attachment end 90 attachable to the structural member of the powertrain 84. The strut body 88 is an elongated structural member having an aperture 92 at an opposite end 94 of the strut body 88 relative to the attachment end 90. As will become clear from the present disclosure, strut 80 is configured to reduce or eliminate forces or vibrations generated in the powertrain 84 from being transmitted to the structural member of the vehicle 82. Mounting block 86, for example, is a block made of metal or other suitable material that is configured to attach to the structural member of the vehicle 82, such as a vehicle frame or beam, through an attachment means such as a bolt and a threaded aperture in the metal block. Similarly, strut body 88 is a bracket made of metal or other suitable material that has at attachment end 90 having a pair of flanges 96 that have apertures 99 that are attachable to a structural member of a powertrain 84 by conventional means.

Strut 80 has a main rubber element 100 that is an elongated member that spans the aperture 92 and is attached to an inside surface of aperture 92 at a first end 102 and to an opposing inside surface of the aperture 92 at a second end 104. Mounting block 86 is fixed or secured to main rubber element 100 by over-molding or insert molding. Likewise, the first and second ends of the main rubber element 100 are fixed or secured to the strut body 88 by over-molding or insert molding or other suitable means. The main rubber element 100 is made of rubber or like material that has a known stiffness value Ksm. Additionally, a first snubber member 106 is attached to the mounting block 86. First snubber member 106 may be fixed or secured to the mounting block 86 by over-molding or insert molding or other suitable means. First snubber member 106 is made of rubber or like material that has a known stiffness value $K_{S1}$. Strut 80 further includes a secondary rubber element 110 that is also disposed in aperture 92 and is attached to an inside surface 112 of aperture 92 at an end 114. Secondary rubber element 110 is made of rubber or like material that has a known stiffness value $K_{S2}$.

Additionally, strut 80 further includes a controlled actuator 120 coupled to a valve 122 (shown in FIG. 2b) to selectively change the stiffness level of strut 80. Controlled actuator 120 is in electrical communication with a control system 124. Control system 124 determines an appropriate overall stiffness level for the strut 80 based on vehicle operating conditions, such as, engine speed, vehicle speed, vehicle body movement, etc.

Figure 2B:
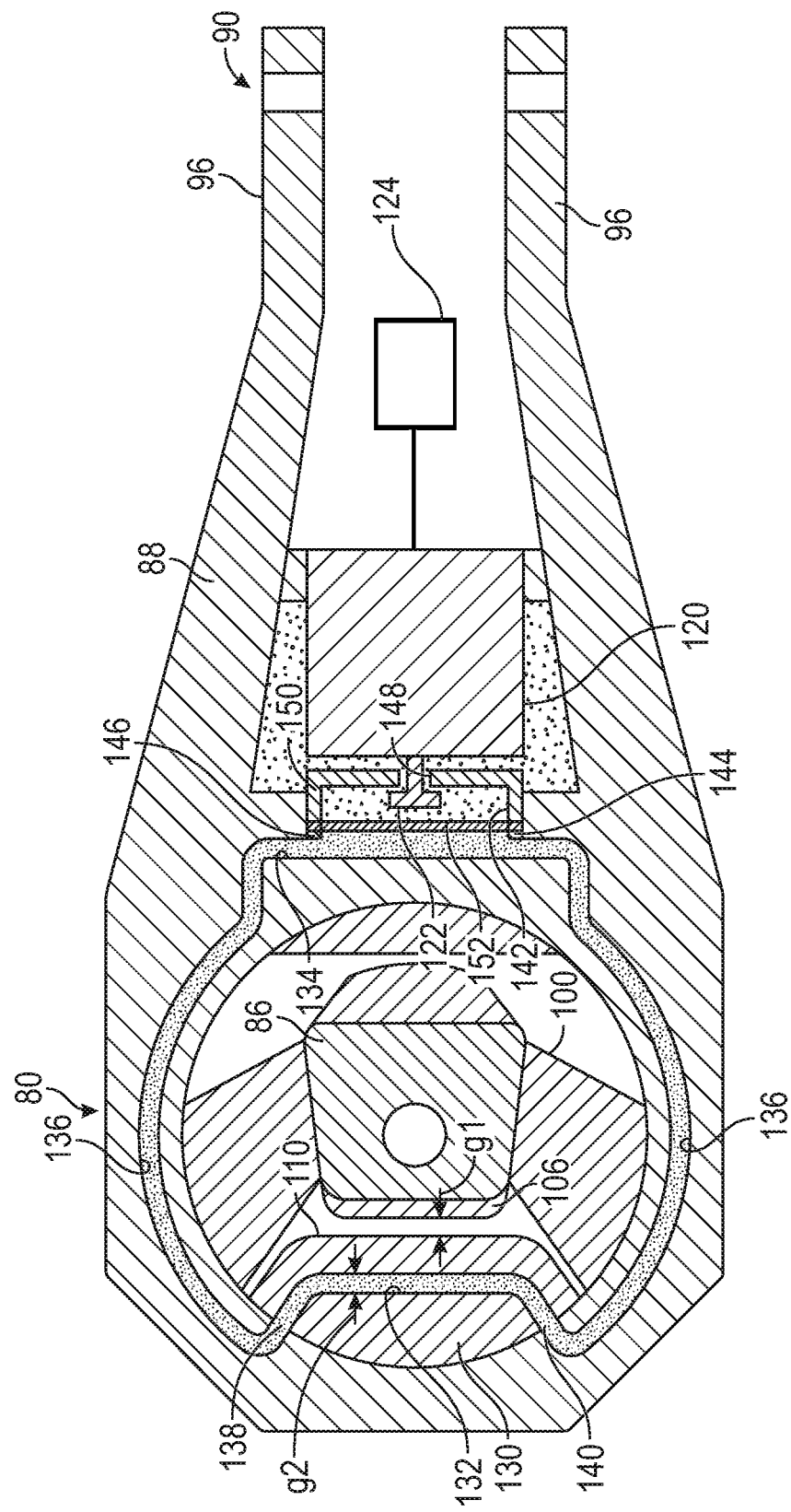
FIG. 2b is a cross-sectional view through the torque strut along line 2b shown in FIG. 2a, in accordance with an aspect of the present invention.

Referring now to FIG. 2b, a cross-sectional view through torque strut 80 along line 2b shown in FIG. 2a is illustrated, in accordance with an embodiment of the present invention. Integrated within secondary rubber element 110 is a secondary snubber element 130. Secondary snubber element 130 is made of rubber or like material that has a known stiffness value $K_{sn}$.

As further illustrated in FIG. 2b, strut 80 has three fluid chambers. The first fluid chamber 132 is a fluid stiffness modulation chamber and is provided in secondary rubber element 110 for holding a volume of fluid, such as hydraulic fluid. The first fluid chamber 132 is a bladder or cavity formed in secondary rubber element 110 adjacent the secondary snubber element 130.

The second fluid chamber 134 is a fluid expansion chamber and is formed in the strut body 88 for receiving a volume of fluid from first fluid chamber 132. A fluid conduit or channel 136 formed in the strut body 88. Fluid conduit or channel 136 interconnects a pair of ports formed in the strut body 88 with the second fluid chamber 134. Ports 138, 140 are in fluid communication with the first fluid chamber 132 to allow the fluid to pass from the first fluid chamber 132 to the second fluid chamber 134. Adjacent the second fluid chamber 134 is the third fluid chamber 142. The third fluid chamber 142 may be partially or fully formed in the strut body 88. A fluid such as air is disposed in the third fluid chamber 142. An opening or aperture 144 is disposed in a dividing wall 146 between the second and third fluid chambers 134, 142. Opposite opening 144, a vent port 148 is provided through an exterior wall 150 of the strut body 88. Disposed across the opening 144 in the dividing wall 146 is a pressure compliant membrane 152. The pressure compliant membrane 152 seals the opening 144 between the second fluid chamber 134 and the third fluid chamber 142 preventing fluid from passing from the second fluid chamber 134 to the third fluid chamber 142. However, the pressure compliant membrane 152 is a flexible membrane that under pressure produced by the fluid in the second chamber 134 protrudes into the third chamber 142 effectively increasing the volume of the second fluid chamber 134 and allowing the volume to decrease in the first fluid chamber 132. The pressure compliant membrane 152 is made of a non-porous material such as rubber or the like.

The valve 122 is configured to seal the vent port 148 in the third fluid chamber 142. The air or other fluid disposed in third fluid chamber 142 is allowed to escape the third fluid chamber 142 by selectively actuating valve 122 to open or close vent port 148.

The present invention further contemplates a method for changing the overall stiffness of the strut 80 from a first stiffness profile to a second stiffness profile. The first stiffness profile is achieved by sending a control signal to the controlled actuator 120 to actuate the valve 122 to open the vent port 148 to release the fluid (i.e. air) in third fluid chamber 142. A first linear stiffness level of first stiffness profile is present in the strut 80 until the main rubber element 100 is displaced the distance g1. A second linear stiffness level of first stiffness profile is achieved in strut 80 when the main rubber element 100 is displaced the distance g1 and until the secondary rubber element 110 is displaced a distance g2. After the main rubber element 100 is displaced the distance g1 and secondary rubber element 110 is displaced a distance g2 the stiffness level of first stiffness profile increases non-linearly according to the combined stiffness of $K_{sm}$, $K_{s1}$, $K_{s2}$, and $K_{sn}$ with additional displacement of main rubber element 100 and secondary rubber element 110. Since the fluid in first fluid chamber 132 is allowed to flow to the second fluid chamber 134, forces are not transmitted from the second compliant member 110 through the fluid to snubber 130.

A second stiffness profile is achieved in strut 80 by sending a control signal to the controlled actuator 120 to actuate the valve 122 to close the vent port 148 to prevent the fluid (i.e. air) in third fluid chamber 142 from escaping chamber 142. Sealing vent port 148 prevents the fluid from moving out of the first fluid chamber 132 and into the fluid conduit or channels 136 and into the second fluid chamber 134. Essentially, the volume of fluid in the first chamber 132 is held fixed such that as the main rubber element 100 is displaced the distance g1 and contacts the secondary rubber element 110 the fluid is incompressible and transmits the forces from the secondary rubber element 110 through the fluid to secondary snubber element 130. A first stiffness level of second stiffness profile is present in the strut 80 until the main rubber element 100 is displaced the distance g1. Since the fluid in first fluid chamber 132 is prevented from flowing to the second fluid chamber 134 and the fluid is incompressible, forces are transmitted from the secondary rubber element 110 through the fluid to secondary snubber element 130. After the main rubber element 100 is displaced the distance g1 the stiffness level of second stiffness profile increases non-linearly according to the combined stiffness of $K_{sm}$, $K_{s1}$, $K_{s2}$, and $K_{sn}$ with additional displacement of main rubber element 100 and secondary rubber element 110.

Advantageously, the system and method of the present disclosure provides a mount assembly that has more than one stiffness profile. Moreover, the desired stiffness profile is selectable based on varying operating conditions of the vehicle. Additionally, the present invention contemplates the inclusion of additional compliant members or rubber elements 26, 110 and additional snubber member or elements 28, 130 attached to the second support member 20 or strut body 88 and spaced apart between the first compliant member 24 or main rubber element 100 and third fluid chamber 34 or 142. Many additional benefits over conventional mount assemblies will be apparent from the above disclosure.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A mount assembly for attaching a powertrain to a structural member of a vehicle, the mount assembly comprising:
   a first support member having an attachment end attachable to the powertrain;
   a second support member having an attachment end attachable to the structural member of the vehicle, wherein the second support member is spaced apart from the first support member;
   a first compliant member having:
      a first attachment end fixed to the first support member;
      a second attachment end fixed to the second support member; and
      a first snubber member opposite the attachment end of the first support member;
   a second compliant member fixed to the second support member, wherein the second compliant member is spaced apart from the first snubber member of the first compliant member;
   a second snubber member fixed to the second support member and spaced apart from the second compliant member;
   a first fluid chamber defined by a surface of the second compliant member, a surface of the second support member and a surface of the second snubber member; and
   a second fluid chamber defined by a first plurality of surfaces of the second support member;
   a fluid conduit interconnecting the first fluid chamber with the second fluid chamber to allow a fluid to pass from the first fluid chamber to the second fluid chamber;

a third fluid chamber adjacent the second fluid chamber and defined by a second plurality of surfaces of the second support member and having an opening in communication with the second fluid chamber and a vent port;

a pressure compliant membrane attached to the second support member and sealing the opening between the second fluid chamber and the third fluid chamber; and a valve selectively sealing the vent port in the third fluid chamber.

2. The mount assembly of claim 1, wherein the first and second fluid chambers are filled with a hydraulic fluid.

3. The mount assembly of claim 1, wherein the third fluid chamber is filled with air.

4. The mount assembly of claim 3, further comprising a controlled actuator coupled to the valve to selectively open the valve and allow air to exit the third fluid chamber.

5. The mount assembly of claim 1, wherein the second support member has an aperture at an end of the second support member.

6. The mount assembly of claim 5, wherein the first compliant member is an elongated member that spans the aperture and is attached to an inside surface of the aperture at a first end and to an opposing inside surface of the aperture at a second end.

7. The mount assembly of claim 1, wherein the second compliant member and the second snubber member are formed as a unitary member.

8. The mount assembly of claim 7, wherein first fluid chamber is a bladder formed within the unitary member.

9. The mount assembly of claim 8, wherein the fluid conduit is formed in the second support member and interconnects the bladder with the second fluid chamber.

10. The mount assembly of claim 1, wherein the pressure compliant membrane is a flexible membrane that under pressure produced by the fluid in the second fluid chamber protrudes into the third fluid chamber to increase a volume of the second fluid chamber.

11. A method for attaching a powertrain to a structural member of a vehicle using a mount assembly, the method comprising:

providing a first support member having an attachment end attachable to the powertrain;

providing a second support member having an attachment end attachable to the structural member of the vehicle, wherein the second support member is spaced apart from the first support member;

providing a first compliant member having:
  a first attachment end fixed to the first support member;
  a second attachment end fixed to the second support member; and
  a first snubber member opposite the attachment end of the first support member;

providing a second compliant member fixed to the second support member, wherein the second compliant member is spaced apart from the first snubber member;

providing a second snubber member fixed to the second support member and spaced apart from the second compliant member;

providing a first fluid chamber defined by a surface of the second compliant member, a surface of the second support member and a surface of the second snubber member; and providing a second fluid chamber defined by a first plurality of surfaces of the second support member;

interconnecting the first fluid chamber with the second fluid chamber with a fluid conduit to allow a fluid to pass from the first fluid chamber to the second fluid chamber;

providing a third fluid chamber adjacent the second fluid chamber and defined by a second plurality of surfaces of the second support member and having an opening in communication with the second fluid chamber and a vent port;

sealing the opening between the second fluid chamber and the third fluid chamber with a pressure compliant membrane attached to the second support member;

determining a desired stiffness profile of the mount assembly;

actuating a valve to open the vent port in the third fluid chamber to achieve a first stiffness profile of the mount assembly; and actuating the valve to close the vent port in the third fluid chamber to achieve a second stiffness profile of the mount assembly.

12. The method of claim 11, wherein determining the desired stiffness profile of the mount assembly further comprises determining whether the first stiffness profile is desired based on an operating condition of the vehicle.

13. The method of claim 11, wherein determining the desired stiffness profile of the mount assembly further comprises determining whether the second stiffness profile is desired based on an operating condition of the vehicle.

14. The method of claim 11, wherein sealing the opening between the second fluid chamber and the third fluid chamber with the pressure compliant membrane attached to the second support member further comprises preventing the pressure compliant membrane from protruding into the third fluid chamber when the second stiffness profile is desired.

15. The method of claim 11, wherein sealing the opening between the second fluid chamber and the third fluid chamber with the pressure compliant membrane attached to the second support member further comprises allowing the pressure compliant membrane to protrude into the third fluid chamber when the first stiffness profile is desired.

16. The method of claim 11, wherein actuating the valve to close the vent port in the third fluid chamber to achieve the second stiffness profile of the mount assembly further comprises fixing a volume of the second fluid chamber by preventing fluid flow from the second fluid chamber to the third fluid chamber thereby preventing fluid from passing from the first fluid chamber to the second fluid chamber.

17. The method of claim 11, wherein actuating the valve to open the vent port in the third fluid chamber to achieve the first stiffness profile of the mount assembly further comprises increasing a volume of the second fluid chamber by allowing fluid to flow into the third fluid chamber thereby allowing fluid to pass from the first fluid chamber to the second fluid chamber.

18. The method of claim 11, wherein actuating the valve to open the vent port in the third fluid chamber to achieve the first stiffness profile of the mount assembly further comprises achieving the first stiffness profile that has a lower stiffness over the same displacement of the first compliant member compared to the second stiffness profile.

19. The method of claim 11, wherein actuating the valve to close the vent port in the third fluid chamber to achieve the second stiffness profile of the mount assembly further comprises achieving the second stiffness profile that has a greater stiffness over the same displacement of the first compliant member compared to the first stiffness profile.

* * * * *